B. A. PROCTOR.
FRAMING MECHANISM FOR MOVING PICTURE MACHINES.
APPLICATION FILED JUNE 21, 1917.
1,298,394.
Patented Mar. 25, 1919.
4 SHEETS—SHEET 2.
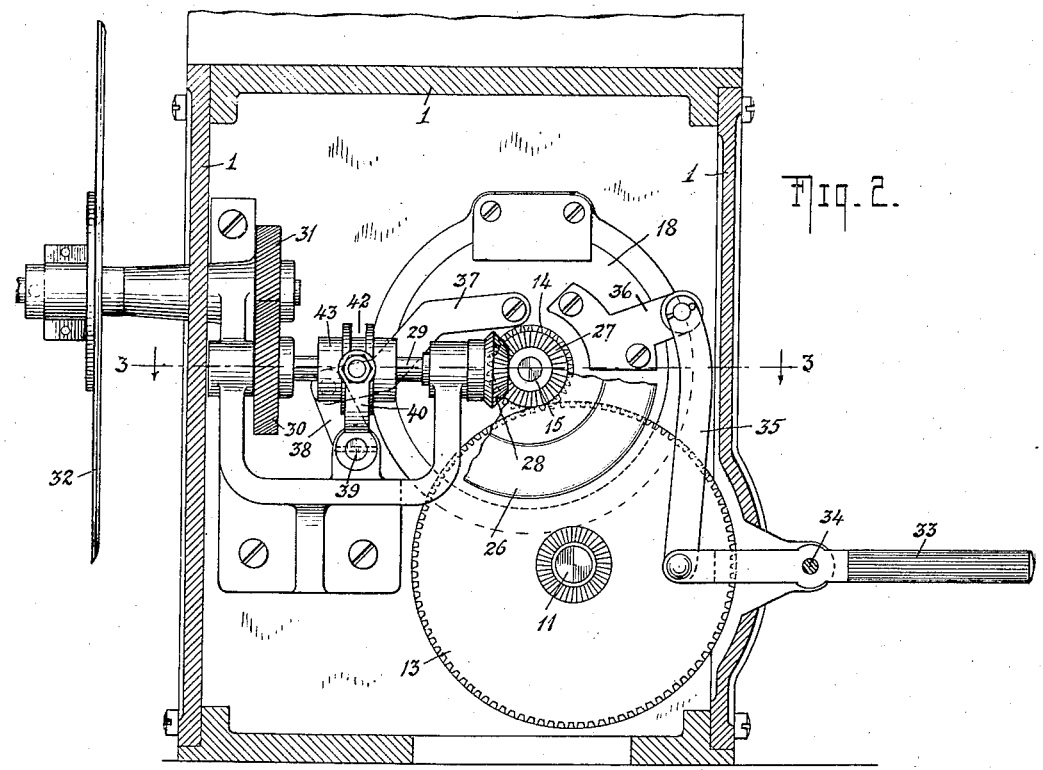
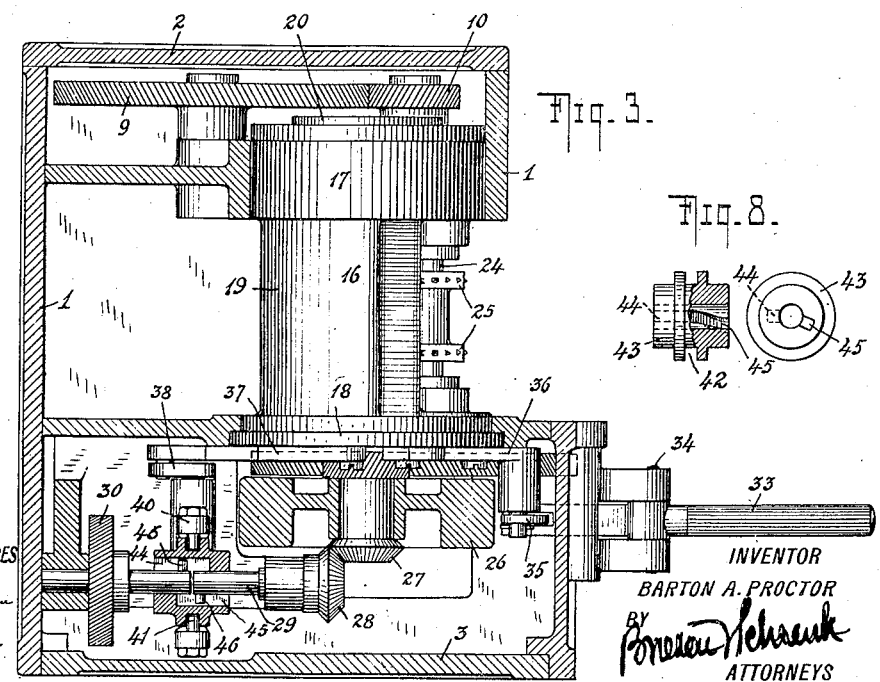
WITNESSES
INVENTOR
BARTON A. PROCTOR
BY
ATTORNEYS

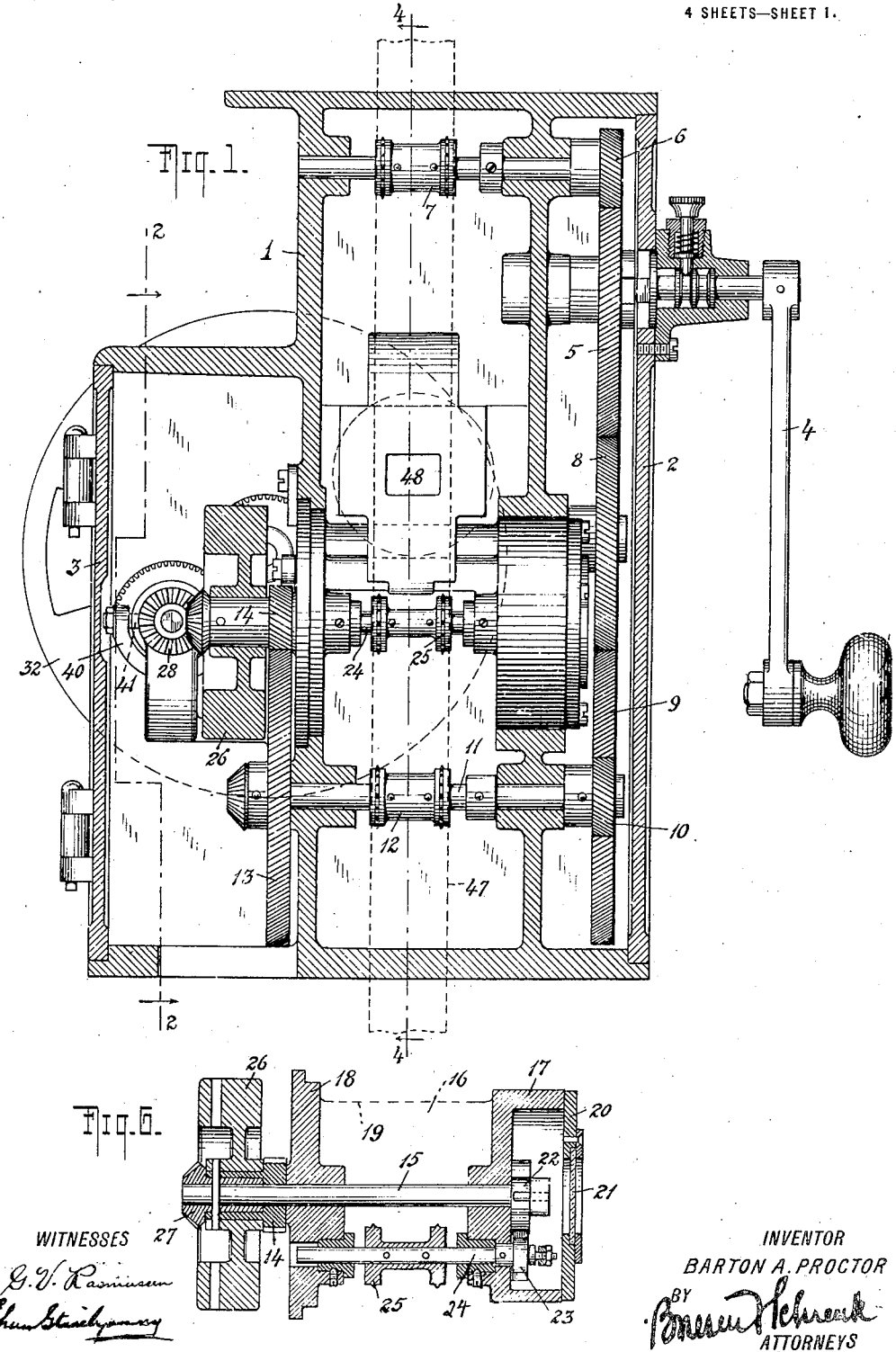

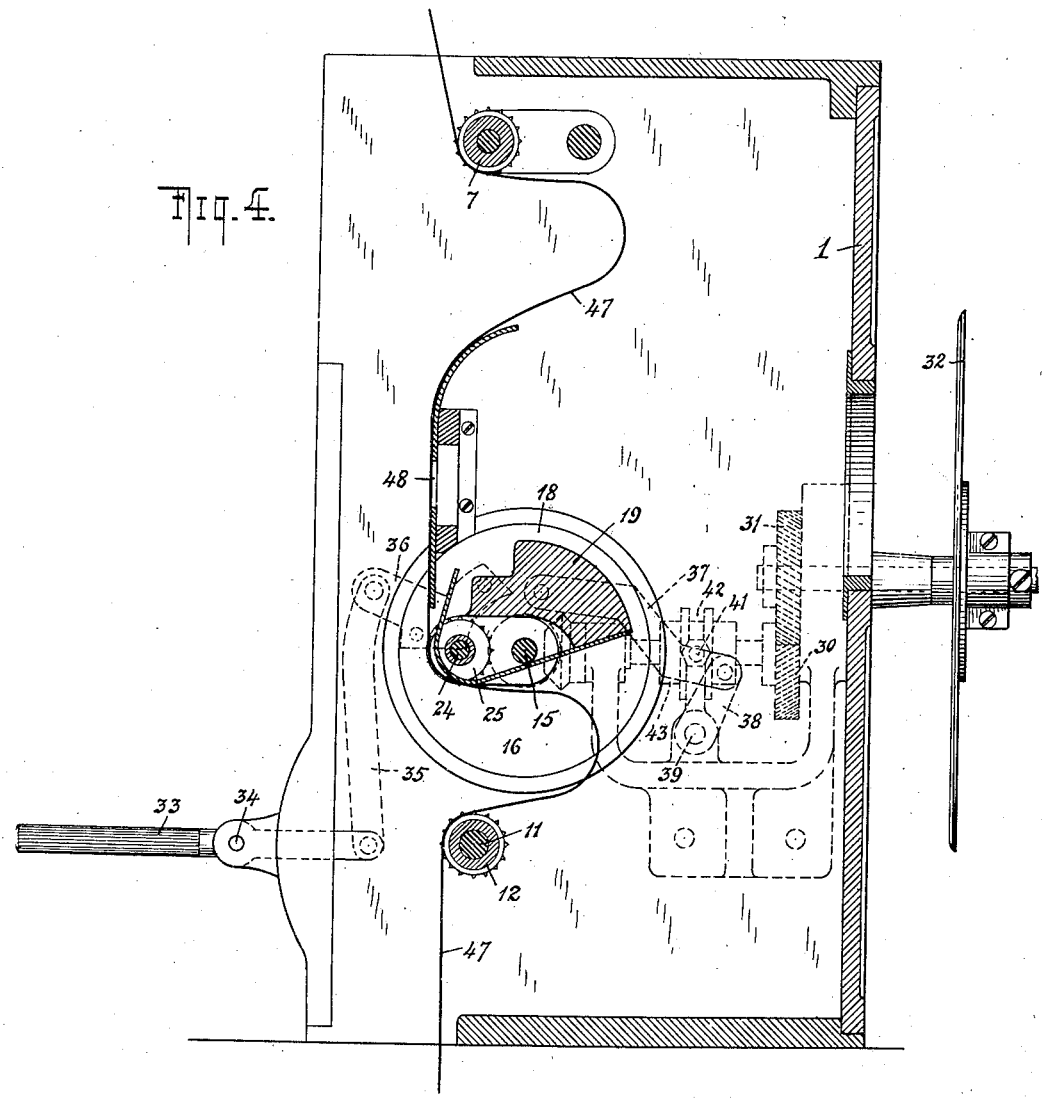

B. A. PROCTOR.
FRAMING MECHANISM FOR MOVING PICTURE MACHINES.
APPLICATION FILED JUNE 21, 1917.

1,298,394.

Patented Mar. 25, 1919.
4 SHEETS—SHEET 4.

WITNESSES

INVENTOR
BARTON A. PROCTOR
BY
ATTORNEYS

UNITED STATES PATENT OFFICE.

BARTON A. PROCTOR, OF BRIDGETON, NEW JERSEY, ASSIGNOR TO KINOIKON APPARATUS CORPORATION, OF BRIDGETON, NEW JERSEY, A CORPORATION OF DELAWARE.

FRAMING MECHANISM FOR MOVING-PICTURE MACHINES.

1,298,394.  Specification of Letters Patent.  Patented Mar. 25, 1919.

Application filed June 21, 1917. Serial No. 176,054.

*To all whom it may concern:*

Be it known that I, BARTON A. PROCTOR, a citizen of the United States, residing at Bridgeton, Cumberland county, State of New Jersey, have invented certain new and useful Improvements in Framing Mechanism for Moving-Picture Machines, of which the following is a specification.

My invention relates to moving picture machines of the kind in which a strip of film having consecutive pictures longitudinally disposed thereon is drawn past an aperture through which projection takes place, the film being stopped intermittently when the individual picture and aperture are in registry.

Films of this kind are provided with marginal perforations and sprocket teeth engaging therewith do the work of drawing the film through the machine.

It often happens that the perforations in different films do not have exactly the same positions with reference to the top and bottom of the individual pictures. Sometimes, also, the film stretches in the course of the manipulations to which it is subjected. Or, the film breaks and must be joined together in which case the proper relation of perforations and individual pictures is not always maintained. And, at times, the perforations will tear or jump out of the sprocket teeth so as to shift the film linearly with respect to the sprocket.

All or any of the above happenings will cause the individual picture to get out of registry with the aperture through which it is projected so that the image on the screen will show parts of two consecutive pictures instead of the whole of one.

It is the object of my invention herein described to provide a novel and simplified arrangement by means of which any loss of registry between picture and aperture can be instantly restored without interrupting the operation of the machine. With the arrangement of my invention any tendency toward loss of perfect registry may be instantly detected and corrected almost before it has taken place.

My invention resides in the novel constructions and arrangements of parts as described below and hereinafter claimed.

Figure 5:
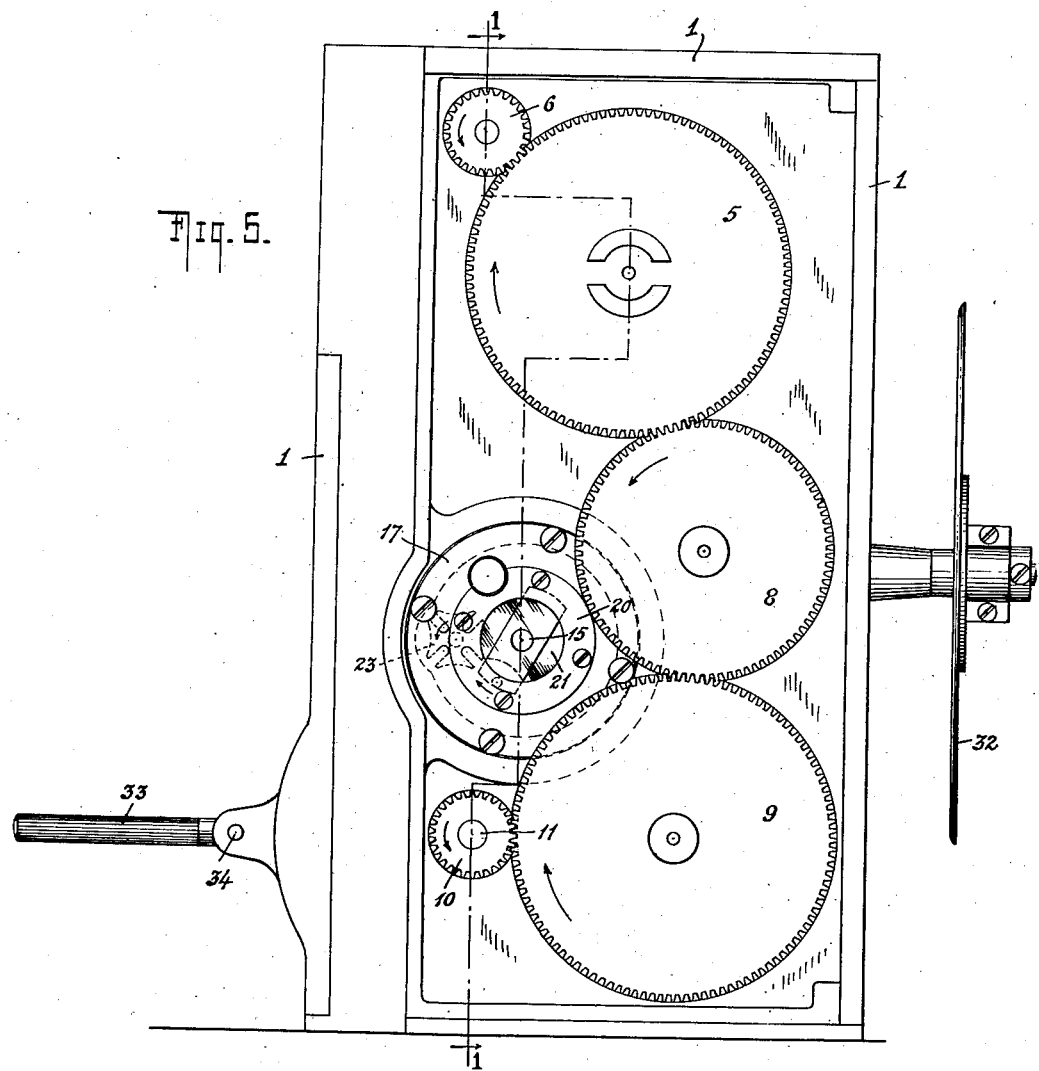
Figure 7:
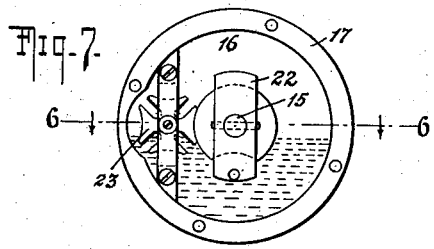

My invention will be better understood by referring to the accompanying drawings, showing a moving picture machine with my invention embodied therein, in which Figure 1 represents a sectional elevation through the display mechanism housing taken along the line 1—1 of Fig. 5; Fig. 2 is a similar view, taken from the left, along the line 2—2 of Fig. 1, the larger part of the fly wheel being broken away; Fig. 3 is a transverse section taken along the line 3—3 of Fig. 2; Fig. 4 is a vertical section, taken from the right, along the line 4—4 of Fig. 1; Fig. 5 is an elevation taken from the right of Fig. 1, the door carrying the crank handle being left open so as to show certain of the driving gears; Fig. 6 is a transverse section through the rotatable framing element taken along the line 6—6 of Fig. 7; Fig. 7 is an end view, taken from the right, of the framing element shown in Fig. 6, the cover plate of the Geneva movement housing being removed; and Fig. 8 represents two views of the compensating slide or sleeve for the shutter, one (at the left) being a side elevation, part section thereof, and the other (at the right) being an end view.

In the drawings the display mechanism housing 1 is provided with two hinged doors 2, 3, at the right and left respectively, the former carrying the driving crank 4, which protect and give access to the gears which drive the sprockets and the shutter.

Crank 4 acts directly upon main driving gear 5 which, in turn, meshes with gear 6 upon the shaft of which is mounted the upper continuous sprocket 7. Gear 5 also drives, through intermediate gears 8, 9, a gear 10 upon whose shaft 11 is mounted the lower continuous sprocket 12. Upon the other end of shaft 11 is fixed a gear 13 which meshes with a gear 14 fixed upon a shaft 15.

Shaft 15 is centrally mounted in a rotatable support 16 comprising concentric heads 17, 18, united by a web 19. Head 17 is recessed and provided with a removable cover 20 having a glass front 21 thus providing an oil tight casing which is partially filled with oil in which are contained and operate the driving member 22 of the Geneva movement, mounted upon one end of central shaft 15, and the driven member 23 of the Geneva element, fixed to shaft 24, also carried by support 16. The usual intermittent sprocket 25 is fixed upon shaft 24.

The other end of shaft 15 has fixed thereupon a fly wheel 26 for steadying the operation of the machine, and a miter gear 27 in mesh with a similar gear 28 mounted upon one end of a divided shaft 29 whose other end carries a gear 30 in mesh with a gear 31 whose shaft carries the shutter 32.

Heads 17 and 18 of support 16 are turned true and are concentric with the axis of shaft 15 and bearings are provided therefor in suitable reinforcing webs of the housing 1. The support 16 is, hence, rotatable about or upon shaft 15 and this rotational movement is conveniently accomplished by means of a handle or framing lever 33 pivotally attached to the housing 1 at 34 and joined by a link 35 to an arm 36 fixed to and projecting radially from head 18.

A second link 37 is also pivotally attached to head 18 and has its outer end similarly joined to a crank arm 38 which is fixed to a short shaft 39 itself carried in bearings fixed to the housing.

Fixed upon shaft 39 is a fork 40 whose ends carry oppositely disposed pins 41 which engage an annular recess 42 formed in a collar which is provided on the sleeve 43 surrounding the divided ends of shaft 29.

Sleeve 43 has two substantially oppositely disposed internal slots, 44, 45, the former being parallel to the axis of the sleeve and extending from the front end of the sleeve (left Fig. 3) to nearly the rear end thereof; and the latter being spirally cut and extending from the rear end of the sleeve (right Fig. 3) to nearly the front end thereof.

Each of the opposed ends of divided shaft 29 is provided with a pin 46 and these pins are engaged, respectively, with the two slots 44, 45.

The operation of the invention is as follows: The crank 4 being turned clockwise (as viewed from the left of Fig. 1) the various gears will all rotate as indicated by the several attached arrows as can readily be seen. The upper and lower sprockets, 7 and 12, will be continuously driven. Sprocket 25, being driven through the Geneva movement, 22, 23, however, will rotate intermittently and place the successive pictures of the film 47 before the aperture 48 in synchronism with the exposure periods of the shutter 32. This assumes, of course, that gears, shutter and film have been properly set before the machine is started running.

Suppose, however, that the intermittent sprocket stops so as to leave the individual pictures of the film either too high or too low with reference to the aperture 48. Or suppose that, in the operation of the machine, the teeth of the intermittent sprocket should gain or lose linearly with respect to the film by a distance equal to that between adjacent or more remote film sprocket holes, a happening which often takes place, as is well known to those skilled in the art. In such case the operator need only move the framing lever 33 one way or the other without interrupting in any way his uniform operation of the driving crank 4. Such movement of the lever 33 will rotate the support 16 in its bearings and about the shaft 15 through the action of link 35 and arm 36.

As the support 16 thus rotates in its bearings, the shaft 24 and intermittent sprocket 25 will rotate about shaft 15 without disturbance of the coöperative relation between the two elements of the Geneva movement. With reference to the aperture 48, it is clear that this rotational movement of the sprocket 25 causes it to be raised or lowered and therefore corresponds to a stopping of the individual pictures of the film at a higher or lower point. Furthermore, it is obvious that if the sprocket 25 is raised, its position of rest will be angularly not quite so far advanced, while, if it is lowered, such position of rest will be further advanced. Hence, raising the framing lever will not only raise the film on account of the corresponding lifting of the intermittent sprocket, but will also raise the film on account of the stopped position of the sprocket being rotated clockwise. And if the framing lever is depressed the film will be similarly lowered for both of these reasons.

By referring to Fig. 5 it will be noticed that raising the framing lever will cause the pin of the Geneva driving member to engage the slot of the driven member later; and that, in lowering the framing lever will cause such pin to engage earlier. The shutter 32, which is driven through the beveled gears 27, 28, shaft 29, and gears 30 and 31, must, therefore, be advanced or retreated correspondingly if synchronism is to be maintained between the shutter and the intermittent sprocket.

This adjustment of the sprocket is accomplished automatically through the fork 40 and sleeve 43. As the support 16 is rotated in the one direction or the other, the fork 40 is correspondingly moved through the link 37 so as to slide the sleeve 43 in the one direction or the other upon the divided shaft 29. Such movement of the sleeve will cause rotation, relatively to one another of the two parts of the divided shaft since the pins 46 fixed in said shaft ends are now shifted in the straight and spiral slots 44 and 45, respectively. These slots being accurately determined, in the first place, the shutter movement can be caused to take place automatically to just the right amount necessary to compensate for the shifting of the sprocket.

While I have shown the sleeve 32 as having one straight and one spiral slot, all that is essential is that these slots be spiral relatively to one another to such an extent as to produce the necessary rotational movement between the two parts of the divided shaft 29.

My improved framing arrangement can be operated without interfering in any way with the operation of the film display mechanism and without stopping the machine.

While I have shown a preferred form of the invention, changes may be made therein without departing from the spirit of the invention and the scope of the following claims:

1. In a moving picture machine provided with an aperture adapted to have a strip of linearly disposed pictures drawn thereover, a support carrying a shaft and having heads concentric with said shaft, fixed bearings for said heads, a Geneva driving member fixed to said shaft, means for driving said shaft, a Geneva driven member in coöperative relation with the Geneva driving member, an eccentric shaft carried by the support and carrying said Geneva driven member, a sprocket wheel fixed to said eccentric shaft, a divided shaft one end of which is operatively connected to the Geneva driving member, a shutter operatively connected with the other end of said divided shaft, and means for simultaneously rotating the support and angularly adjusting the two ends of the divided shaft.

2. In a moving picture machine provided with an aperture adapted to have a strip of linearly disposed pictures drawn thereover, a support carrying a shaft and having heads concentric with said shaft, fixed bearings for said heads, a Geneva driving member fixed to said shaft, means for driving said shaft, a Geneva driven member in coöperative relation with the Geneva driving member, an eccentric shaft carried by the support and carrying said Geneva driven member, a sprocket wheel fixed to said eccentric shaft, a divided shaft one end of which is operatively connected to the Geneva driving member, a shutter operatively connected with the other end of said divided shaft, a sleeve surrounding the two opposed ends of the divided shaft and having interior slots which are relatively spiraled, pins on the two divided shaft ends, one pin engaging each slot, a handle for rotating the support and a link between support and sleeve so that as the support rotates the sleeve is slid upon the support and causes the two parts of the divided shaft and causes the two parts thereof to rotate relatively to one another.

3. In a moving picture machine provided with an aperture adapted to have a strip of linearly disposed pictures drawn thereover, a rotatable framing element or support comprising a pair of coaxial heads united by a web, a central and an eccentric shaft carried by said support, the former carrying a Geneva driving element and the latter a coöperating Geneva driven element at similar ends, one of the heads being recessed so as to inclose said Geneva elements, a cover for said recess so as to convert it into an oil tight casing, and a sprocket fixed to the eccentric shaft between the heads.

In testimony whereof I have hereunto set my hand.

BARTON A. PROCTOR.